(12) United States Patent
Simic et al.

(10) Patent No.: US 7,546,292 B2
(45) Date of Patent: Jun. 9, 2009

(54) MASTER-DETAIL PROVIDER AND METHOD OF PROVIDING MASTER-DETAIL FUNCTIONALITY

(75) Inventors: Mirjana Simic, Ottawa (CA); Vladimir Mordvinov, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 11/408,672

(22) Filed: Apr. 21, 2006

(65) Prior Publication Data
US 2006/0294075 A1    Dec. 28, 2006

(30) Foreign Application Priority Data
Jun. 23, 2005  (CA)  .................... 2510643
Sep. 13, 2005  (CA)  .................... 2519604

(51) Int. Cl.
*G06F 17/30* (2006.01)
(52) U.S. Cl. .......................... 707/3; 707/100
(58) Field of Classification Search ................ 707/2–5, 707/100
See application file for complete search history.

(56) References Cited

U.S. PATENT DOCUMENTS 6,785,756 B2 *  8/2004  Candea et al. ............... 710/220
7,296,099 B2 * 11/2007  Davison ....................... 710/15

* cited by examiner

*Primary Examiner*—Cheryl Lewis
(74) *Attorney, Agent, or Firm*—Samuel K. Simpson; Patent Ingenuity, P.C.

(57) ABSTRACT

A master-detail provider is provided for processing user requests for data stored in one or more data source. The master-detail provider has a query analyzer, a master-detail link handler, a master query handler and a detail query handler. The query analyzer analyzes one or more queries included in a user request, and determines any set of the queries in which the queries are linked by one or more master-detail links. The master-detail link handler relates the queries of each set that are linked by one or more master-detail links as a master query and one or more detail queries. The master query handler causes preparation of the master queries to generate master query plans, and generates provider queries by incorporating the master query plans with related detail queries and related master-detail links. The detail query handler handles the detail queries causing preparation of the detail queries to generate detail query plans.

22 Claims, 10 Drawing Sheets

220

```
<providerQuery name="Query1.0" provider="MasterDetailProvider">
    <plans>
        <plan lifetime="request">
            <planDetails>
```

212

```
<masterQueryPlan>
    <querySet>
        <modelPath>GO Sales and Retailers_OR</modelPath>
        <queries>
            <providerQuery name="Query1.0" provider="RelationalQueryProvider">
                :
            </providerQuery>
        </queries>
    </querySet>
</masterQueryPlan>
```

```
212

<masterQueryPlan>
    <querySet>
        <modelPath>GO Sales and Retailers_OR</modelPath>
        <queries>
            <providerQuery name="Query1.0" provider="RelationalQueryProvider">
                :
            </providerQuery>
        </queries>
    </querySet>
</masterQueryPlan>
```

242

```
<detailFilter>
    <filter>
        <filterExpression rID="11">[Product line] = ?Query1.0_Product line?</filterExpression>
    </filter>
</detailFilter>
```

```
<providerQuery name="Query2.1" provider="RelationalQueryProvider">
    :
    <detailFilter>
        <filter>
            <filterExpression rID="13">[Product type] = ?Query1.0_Product type?</filterExpression>
        </filter>
    </detailFilter>
    :
</providerQuery>
```

```
<message code="888" severity="error" title="QFS-ERR-0139 The request has multiple errors.
QE-DEF-0354 The query contains one or more unresolved prompts.
QE-DEF-0144 Prompt 'Query1.0_Product type' has no substitution values."
type="general">
    <response>
        <parameters>
            <item>
                <name xsi:type="xsd:string">Query1.0_Product type</name>
                <type xsi:type="bus:parameterDataTypeEnum">xsdString</type>
                <modelFilterItem xsi:type="xsd:string">[gosales_goretailers].[Products].[Product type]</modelFilterItem>
            </item>
        </parameters>
        <messages>
            <message code="888" severity="error" title="QFS-ERR-0139 The request has multiple errors.
QE-DEF-0354 The query contains one or more unresolved prompts.
QE-DEF-0144 Prompt 'Query1.0_Product type' has no substitution values."
type="general"/>
        </messages>
    </response>
</message>
```

```
<parameters>
    <item>
        <name xsi:type="xsd:string">Query1.0_Product line</name>
        <type xsi:type="bus:parameterDataTypeEnum">xsdString</type>
        <modelFilterItem xsi:type="xsd:string">[gosales_goretailers].[Products].[Product line]</modelFilterItem>
        <value>
            <item>
                <use>Golf Equipment</use>
            </item>
        </value>
    </item>
</parameters>
```

```
<execute>
    <querySet>
        <modelPath>GO Sales and Retailers_OR</modelPath>
        <queries>
            <query name="Query2">
                <detailFilter>
                    <filter>
                        <filterExpression rID="10">[Product line] = ?Query1.0_Product line?</filterExpression>
                    </filter>
                </detailFilter>
            </query>
        </queries>
    </querySet>
    <parameters>
        <item>
            <name xsi:type="xsd:string">Query1.0_Product line</name>
            <type xsi:type="bus:parameterDataTypeEnum">xsdString</type>
            <modelFilterItem xsi:type="xsd:string">[gosales_goretailers].[Products].[Product line]</modelFilterItem>
            <value>
                <item>
                    <use>Mountaineering Equipment</use>
                </item>
            </value>
        </item>
    </parameters>
</execute>
```

Figure 8B

MASTER-DETAIL PROVIDER AND METHOD OF PROVIDING MASTER-DETAIL FUNCTIONALITY

FIELD OF INVENTION

The present invention relates to a master-detail provider and a method of providing master-detail functionality, and especially to a reusable master-detail provider and a method of providing master-detail functionality in an open architecture of a query processing system.

BACKGROUND OF THE INVENTION

Many organizations use data stores for storing business data, such as financial data and operational data. In order to assist business users to examine their data, various data analyzing applications are proposed. Those data analyzing applications provide various views or reports of data to users. Those data analyzing applications typically have query engines that access the data stores to obtain desired data.

Those data analyzing applications issue requests of data from the data stores. A request may contain queries that are related by master-detail relationships. Some query engines process these queries using master-detail functionality which resolves master queries and detail queries separately, and incorporates the results of detail queries into subsections of their associated master queries.

The existing master-detail functionality is part of a query engine and has limited flexibility. It is therefore desirable to provide an improved mechanism to provide the master-detail functionality.

SUMMARY OF THE INVENTION

It is an object of the invention to provide an improved master-detail provider and a method of providing master-detail functionality.

The present invention uses a reusable master-detail provider.

According to the present invention there is provided a master-detail provider for processing user requests for data stored in one or more data sources. The master-detail provider comprises a query analyzer, a master-detail link handler, a master query handler and a detail query handler. The query analyzer is provided for analyzing one or more queries included in a user request, and determining any set of the queries in which the queries are linked by one or more master-detail links. The master-detail link handler is provided for relating the queries of each set that are linked by one or more master-detail links as a master query and one or more detail queries. The master query handler is provided for causing preparation of the master queries to generate master query plans, and for generating provider queries by incorporating the master query plans with related detail queries and related master-detail links. The detail query handler is provided for causing preparation of the detail queries to generate detail query plans.

In accordance with another aspect of the invention, there is provided a query framework system for processing user requests for data stored in one or more data sources. The query framework system comprises one or more query operation providers, each capable of preparing or executing relevant queries; a coordination planner for coordinating communication between the query operation providers; and a master-detail provider. The master-detail provider comprises a query analyzer, a master-detail link handler, a master query handler and a detail query handler. The query analyzer is provided for analyzing one or more queries included in a user request, and determining any set of the queries in which the queries are linked by one or more master-detail links. The master-detail link handler is provided for relating the queries of each set that are linked by one or more master-detail links as a master query and one or more detail queries. The master query handler is provided for causing preparation of the master queries to generate master query plans, and for generating provider queries by incorporating the master query plans with related detail queries and related master-detail links. The detail query handler is provided for causing preparation of the detail queries to generate detail query plans.

In accordance with another aspect of the invention, there is provided a method of processing user requests for data stored in one or more data source. The method comprises the steps of analyzing each set of the queries included in a user request for data to locate any set of the queries in which the queries are linked by one or more master-detail links; relating the queries of each set that are linked by one or more master-detail links as a master query and one or more detail queries; causing preparation of the master queries to generate master query plans; generating one or more provider queries by incorporating the master query plans with related detail queries and related master-detail links; and sending the provider queries for execution.

In accordance with another aspect of the invention, there is provided a memory containing computer executable instructions that can be read and executed by a computer for caring out a method of processing user requests for data stored in one or more data source. The method comprises the steps of analyzing each set of the queries included in a user request for data to locate any set of the queries in which the queries are linked by one or more master-detail links; relating the queries of each set that are linked by one or more master-detail links as a master query and one or more detail queries; causing preparation of the master queries to generate master query plans; generating one or more provider queries by incorporating the master query plans with related detail queries and related master-detail links; and sending the provider queries for execution.

In accordance with another aspect of the invention, there is provided a carrier carrying a propagated signal containing computer executable instructions that can be read and executed by a computer, the computer executable instructions being used to execute a method of processing user requests for data stored in one or more data source. The method comprises the steps of analyzing each set of the queries included in a user request for data to locate any set of the queries in which the queries are linked by one or more master-detail links; relating the queries of each set that are linked by one or more master-detail links as a master query and one or more detail queries; causing preparation of the master queries to generate master query plans; generating one or more provider queries by incorporating the master query plans with related detail queries and related master-detail links; and sending the provider queries for execution.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 7A is a diagram showing an example of a detail filter;

FIG. 7B is a diagram showing an example of a provider query;

FIG. 7C is a diagram showing an example of a message;

FIG. 8A is a diagram showing an example of a parameters; and

FIG. 8B is a diagram showing an example of execution.

DETAILED DESCRIPTION

Figure 1:
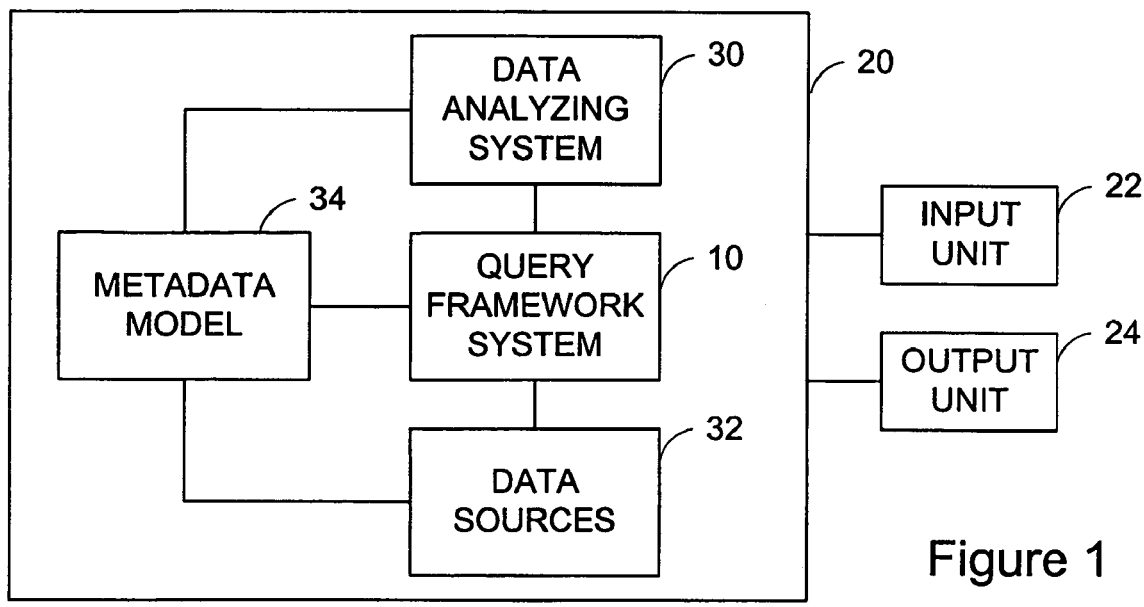
FIG. 1 is a block diagram showing a query framework system in which a master-detail provider in accordance with an embodiment of the present invention is suitably used.
Figure 2:
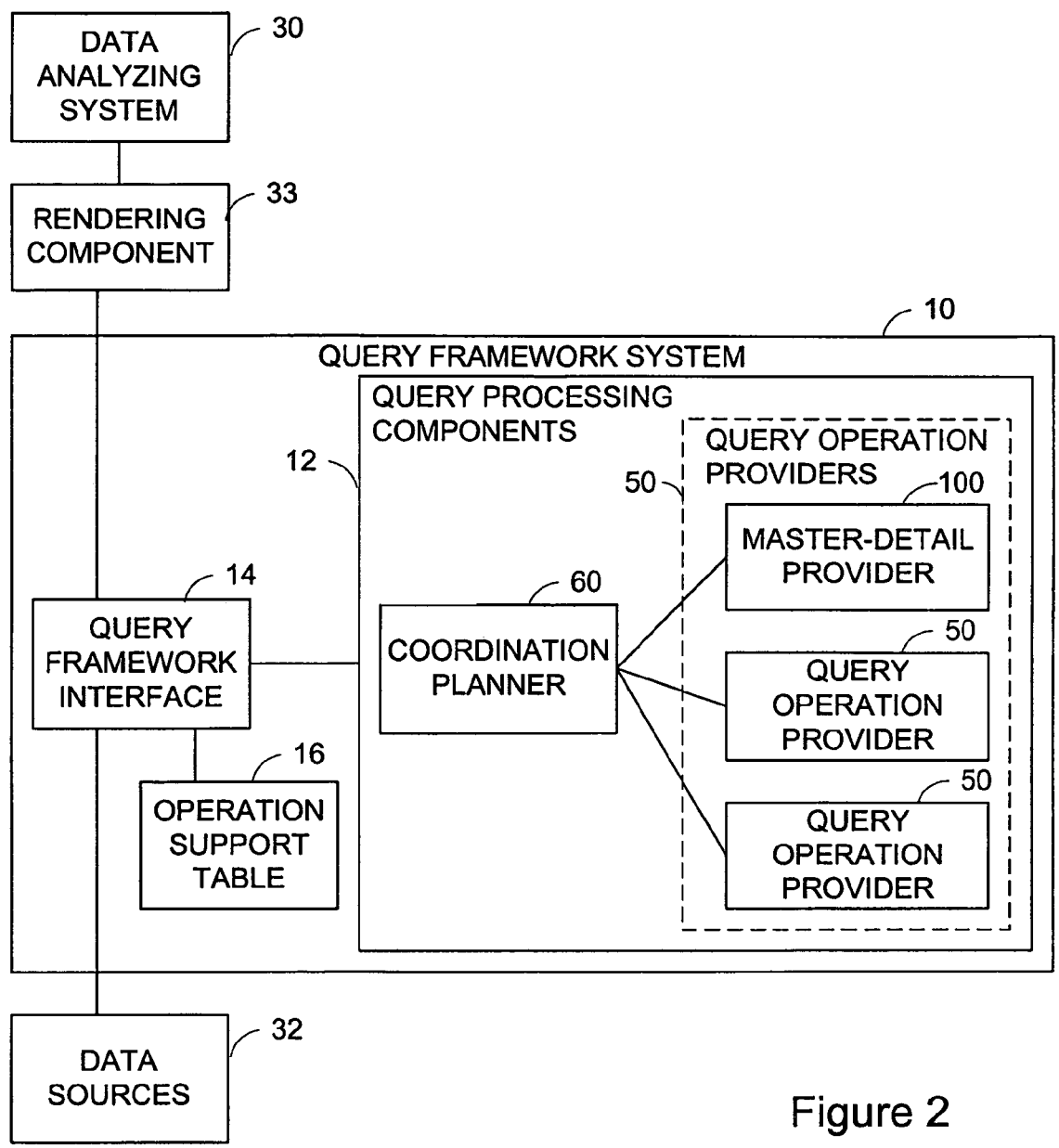
FIG. 2 is a block diagram showing the query framework system.

FIGS. 1 and 2 show a query framework system 10 in which a master-detail provider 100 (FIG. 2) in accordance with an embodiment of the application is suitably used. The master-detail provider 100 may be a standalone pluggable component as shown in FIG. 2, or a part of a component that processes user requests containing one or more queries. The following descriptions describe an embodiment of the master-detail provider as a standalone component, but the invention is not limited to such an embodiment.

The query framework system 10 is used in a computer system 20 having an input unit 22 and an output unit 24. The query framework system 10 is provided to receive user requests from a data analyzing system 30 and process the received user requests to retrieve requested data from one or more data sources 32.

The query analyzing system 30 is an application that provides various views of data in the data sources 32 to allow users to analyze the data. When a user requests a view of data, the query analyzing system 20 generates a user request. To generate user requests, the query analyzing system 20 may use a metadata model 34 that contains metadata of the data sources 32. The user request is in a query language that the query analyzing system 20 uses to issue the user request. Some query analyzing system 20 may issue a user request in a data source language, such as SQL, and some query analyzing system 20 may issue a user request in a language specific to the query analyzing system 20.

The rendering component 33 intercepts user requests generated by the data analyzing system 30 and then passes it to the query framework system 10. The query framework system 10 processes and executes the user requests to retrieve desired data from the data sources 32 and return request results to the rendering component 33, that in turn presents the request results in a readable form.

As shown in FIG. 2, the query framework system 10 has multiple query processing components 12. Query processing components 12 share a common interface 14 and a common query language of the query framework system 10. Query processing components 12 are pluggable components. Query processing components 12 include a set of query operation providers 50, and a coordination planner 60. The query framework system 10 may also have an operation support table 16 that describes functionalities of the query operation providers 50.

The coordination planner 60 organizes interaction between the query processing components 12. The interaction is carried out through the common interface 14 and based on the common query language. The coordination planner 60 divides the query processing into two phases: query planning or preparation phase and a query execution phase.

During the query preparation phase, the coordination planner 60 converts a user request received from the data analyzing system 30 into a converted query or a query framework (QF) query. A QF query plays the role of a query specification that the query operation providers 50 use to communicate to each other and to the coordination planner 60 within the query framework system 10. The QF query definition is an extension of the user request specification defined by the data analyzing system 30. The coordination planner 60 and the query framework system 10 are further described in co-pending patent application Ser. No. 11/408,705; which is hereby incorporated by reference.

During the query preparation phase, the coordination planner 60 interacts with components in order to identify and plan the operations associated with each component involved in the query preparation process, and to determine the sequence of these operations. The coordination planner 60 may use one or more query operation providers 50 during the query preparation phase. The coordination planner 60 invokes the operation providers 50 in accordance with the sequence stored in the system configuration and passes to a given provider a QF query part identified as supported by this provider. The coordination planner 60 determines which QF query part is supported by the provider based on the operation support table 16 associated with the provider. The coordination planner 60 then calls the "prepare" method of the invoked provider. This method consumes a QF query as an input and returns transformed version of this QF query as an output. The output QF query contains one or more provider queries when the QF query is relevant to the invoked provider. A provider query represents the planned version of a query part that is ready for execution. The provider query is assigned to a query operation provider responsible for the execution of this provider query. The output is unchanged when the provider finds the request to be irrelevant to its functionality. The end result of the preparation phase is an output QF query that is completely comprised of provider queries. This output QF query is ready for the execution phase and called an "execution plan".

During the query execution phase, the coordination planner 60 distributes the provider queries or query operations to associated query operation providers 50. It invokes providers following the execution plan structure, starting from leaf nodes up to the root. When invoking providers at this phase, it calls the "execute" provider method, passing the provider query and, in case of the non-leaf nodes, a set of datasets, which are the objects representing a result data stream of every operation in the query framework 10.

Each query operation provider 50 is capable of performing a specific operation on queries. Query operation providers 50 include the master-detail provider 100 as well as one or more query planner providers and/or query transformation and service providers. Query planner providers are responsible for replacement of the received user request with provider queries. Normally query planner providers are components that provide access to data either through internal operations or by calling external components providing data. Query transformation providers are responsible for preprocessing of the received user request, and transform the received QF query into another form in order, for example, to make it simpler or supported by other components in the query framework system 10. Service providers are responsible for locally executed operations, not supported natively by query planner providers. At execution time each service provider consumes an input dataset, apply to it a certain operation, and then outputs another dataset corresponding to the result of the operation. While FIG. 2 shows three query operation providers, there may be fewer or more query operation providers in the query framework system 10.

A user request issued by the data analyzing system 20 often contains multiple queries. Some queries are related to each other in a relation of master and detail. Where the instances of the detail queries are dependent of the context of its related master query, a master-detail operation may be applied to the master and detail queries. The master-detail operation is a way of incorporating the results of detail queries into subsections of a master query result.

The master-detail provider 100 is a query service provider. It encapsulates the master-detail operation as a standalone component. Thus, it is suitable to participate in the open query processing architecture responsible for query processing, such as the query framework system 10. The master-detail provider 100 is reusable.

The master-detail provider 100 centralizes the planning and execution procedures of the separate queries that are linked by a master-detail data relationship between them. The master query determines when each detail query should be rendered. The data relationship, i.e., the master-detail link, determines under which conditions each detail query should be rendered. The detail query is executed and rendered for each value of the master query result column involved in the condition(s) specified in the master-detail link.

Any master query may have relationship to one or more detail queries that are rendered side-by-side beneath the same master query. Any detail query may act as a master query for another detail query.

The master-detail provider 100 invokes preparation and execution of specifications of two or more separate queries with one or more relationships between them. The relationship between the queries is specified in a master-detail link context of either master or detail query. The relationship is defined between a result column of the master query and a parameter or a result column (data item) of the detail query.

For example, a relationship may be specified as follows:

```
<masterDetailLink>
    <masterContext refQueryResultDefinition="MasterQuery">
```

-continued

```
        <dataItemContext refDataItem="Order year"/>
    </masterContext>
    <detailContext refQueryResultDefinition="DetailQuery">
        <dataItemContext refDataItem="Order year"/>
    </detailContext>
</masterDetailLink>
```

Two master-detail link definition types are supported: item-based and parameter-based. The item-based master-detail links relate the values of columns in result datasets of the master and detail queries, so that an instance of a detail query contains the same values of the detail dataset column used in the link as a given value of the master dataset column used in the link. The parameter-based master-detail links relate a column of result dataset of the master query and the parameter of the detail query. A given value of a master dataset column is used to provide an actual value of the parameter in the detail query.

Figure 2A:
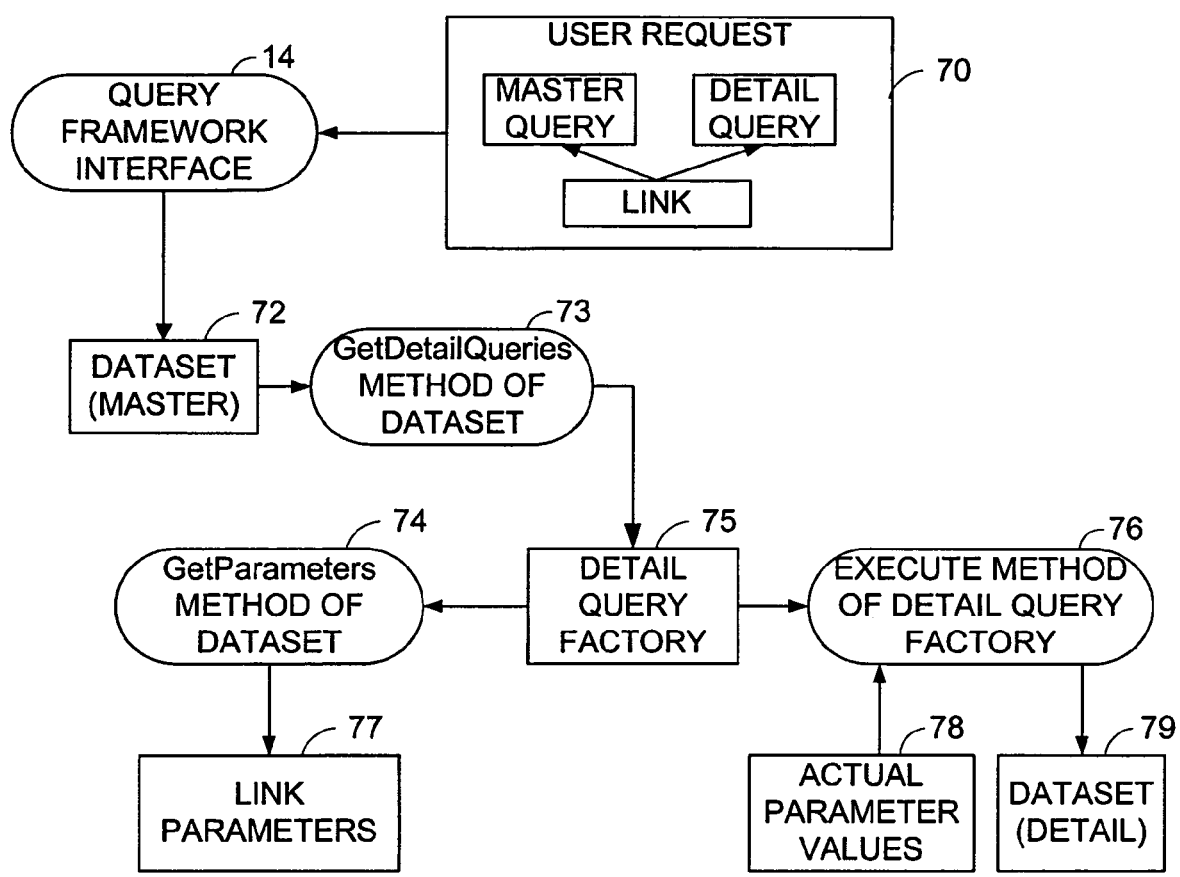
FIG. 2A is a diagram showing a workflow of the master-detail operation in accordance with an embodiment of the invention.

FIG. 2A shows the workflow of the master-detail operation. A user request involving a master-detail link definition 70 is received by the query framework interface 14 of the query framework system 10. Result of a master query as any query participating in a request sent to the query framework 10 is returned as a dataset object 72. The method GetDetailQueries of the master dataset 73 returns zero or more detail query factory objects 75. A detail query factory object is created per a master-detail link associated with the master query materialized by the dataset 72. There can be more than one link to a query and hence there can be more than one detail query factory object 75 returned. The detail query factory object 75 has the method GetParameters 74 describing the link parameters 77 to be submitted in order to produce an instance of a detail query 79. The parameter names encode a reference to a corresponding item of the master query involved in the link. This sequence of actions is initiated by the rendering component 33 external to the query framework 10. It sends a user request to the query framework 10 based on the instructions received from the data analyzing system 30. When master datasets 72 is returned back to the rendering component 33, the rendering component 33 calls the method GetDetailQueries to determine the need for the actions used for master-detail linking, and. After that the rendering component 33 calls the GetParameters method 74 to determine the parameters used for detail query generation as well as the relationship of these parameters to the items of the master dataset. The rendering component 33 starts then iterating over the master dataset rows. For every row, the rendering component 33 collects a set of values of master dataset columns involved in the linking. These values form the set of actual parameter values 78 used when the rendering component 33 then calls the execute method 76 of detail query factory to get an instance of a detail dataset 79.

The master-detail provider 100 allows the flexibility of the query definition for various types of queries that can be used to represent either the master or detail query.

Figure 3:
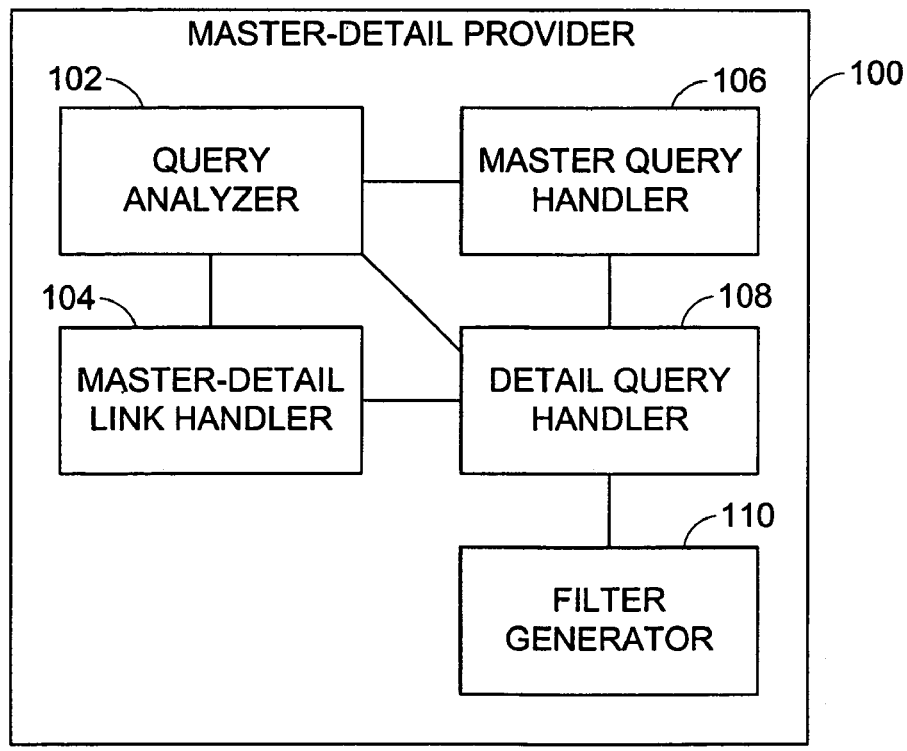
FIG. 3 is a block diagram showing a master-detail provider in accordance with an embodiment of the present invention.

As shown in FIG. 3, the master-detail provider 100 has a query analyzer 102, a master/detail link handler 104, a master query handler 106 and a detail query handler 108.

The query analyzer 102 analyses the set of queries included in a received user request, and determines if any of these queries are linked by one or more master-detail relationships or links. The master-detail link handler 104 relates a set of the queries as a master query and one or more detail queries if master-detail links are located. The master query handler 106 handles master queries. It causes preparation of each master query to generate a master query plan. The master query handler 106 generates one or more provider queries associated with the master-detail provider 100, a provider query per a master query participating in linking, by incorporating the master query plan with related detail queries and related master-detail links. The detail query handler 108 handles detail queries. The detail query handler 108 has a filter generator 110 for generating filters for detail queries.

Figure 4:
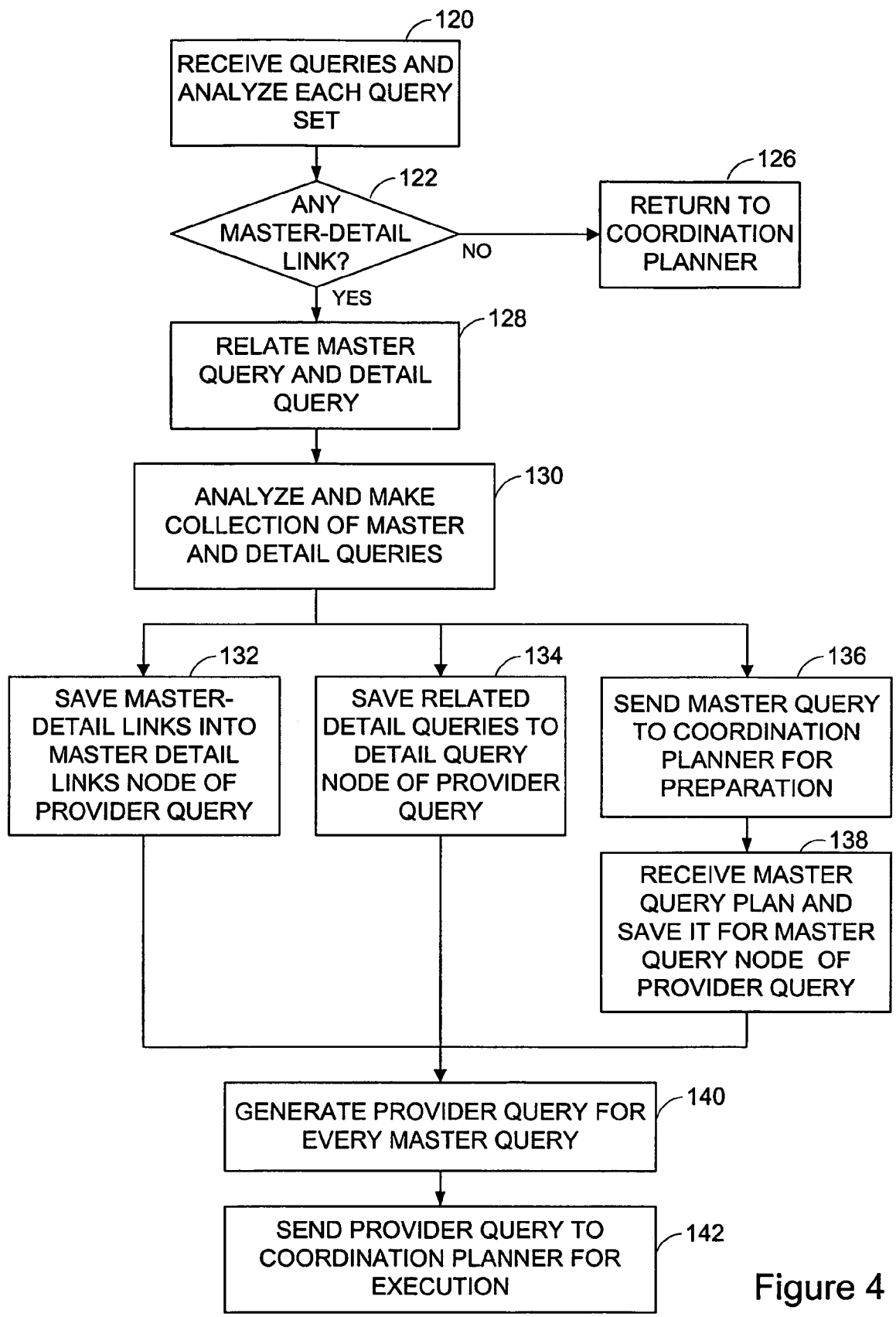
FIG. 4 is a flowchart showing operation of the master-detail provider in accordance with an embodiment of the present invention.
Figures 5, 5A, 5B:
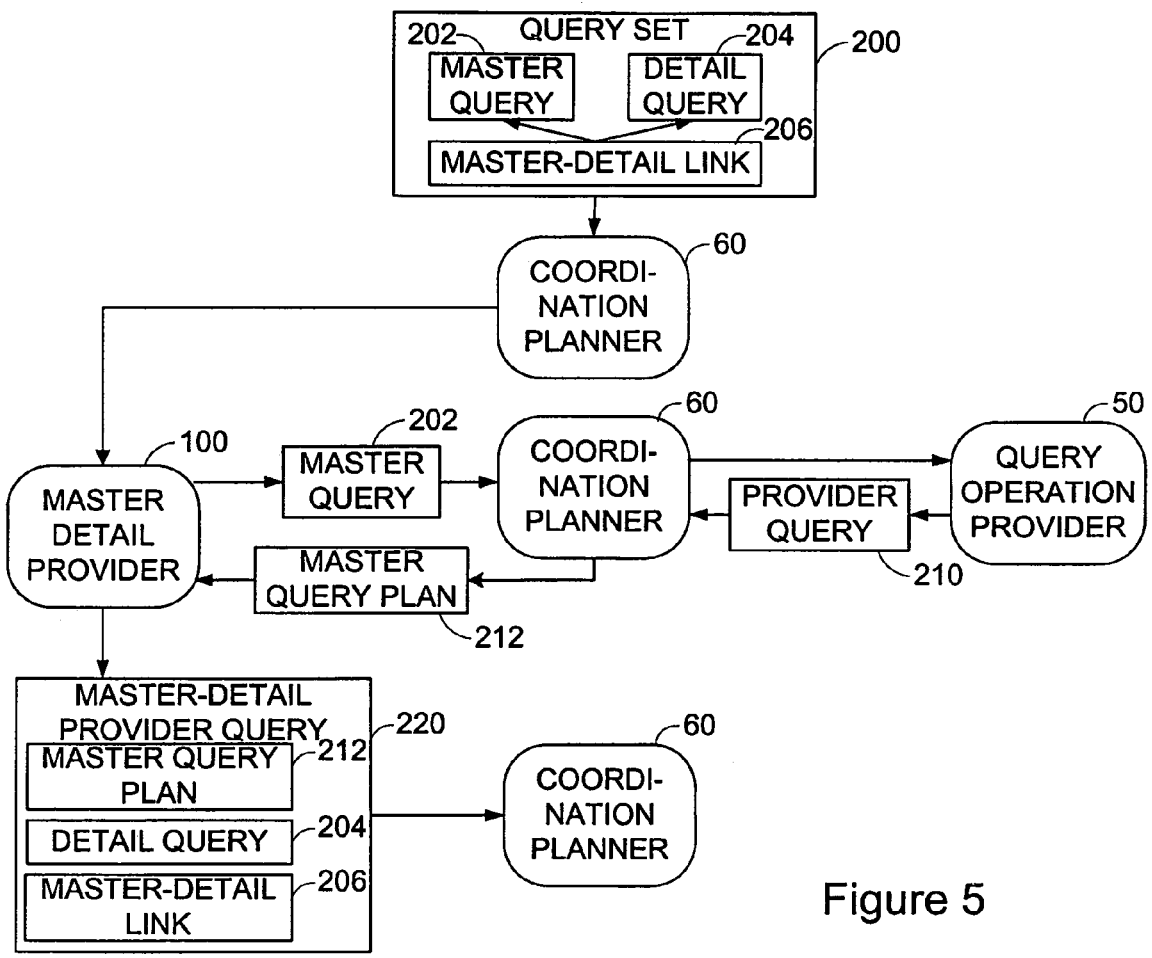
FIG. 5 is a flowchart showing interaction of the master-detail provider with a coordination planner during the preparation phase.
FIG. 5A is a diagram showing an example of a provider query.
FIG. 5B is a diagram showing an example of a master query plan.

The operation of the master-detail provider 100 during the preparation of a user request is now described referring to FIGS. 4 and 5.

The master-detail provider 100 receives multiple queries of a user request from the coordination planner 60 and analyzes this query set (120). The master-detail provider 100 analyzes the queries and determines if this query set has any master-detail link (122). If a query set does not include any master-detail link between the queries of the query set, the master-detail provider 100 returns the query set unchanged to the coordination planner 60 (126) for further processing. If all queries in the user request do not have any master-detail link, the role of the master-detail provider 100 is finished for the user request.

If a request 200 includes one or more master-detail links 206 (122), the master-detail provider 100 relates the master query 202 and the detail query 204 using the context of the master-detail links 206 (128).

Once all queries are analyzed, the master-detail provider 100 analyzes the located master-detail links 206 and determines which master query 202 is linked with which detail query or queries 204 by which master-detail link or links 206. There may be one or more master queries 202. Based on the results, the master-detail provider 100 makes a collection of master queries 202 and related detail queries 204 (130).

For each master query 202, the master-detail provider 100 preserves related master-detail links 206 to a master-detail links node of a provider query (132), and related detail queries 204 to a detail query node of a provider query (134).

The master-detail provider 100 then sends the master queries 202, each master query 202 as a request, to the coordination planner 60 for preparation of the master query 202 for subsequent execution (136). The coordination planner 60 dispatches each request to its relevant query operation provider or providers 50 which prepare the master query 202 included in the request. The query operation providers 50 replace a master query or a master query tree with a tree of provider queries 210. At the end of this process, a master query execution plan 212 is returned back to the master detail provider 100, a plan per a master query 202. The result of the preparation of the master queries 202 is a collection of execution plans 212, equivalents of the query expressed as a tree of provider queries, generated from the master queries 202.

The master-detail provider 100 receives the master query plan 212 (138) which contains the prepared provider queries 210. The master-detail provider 100 then generates its own provider query 220 that incorporates the master query plan 212, the related detail queries 204 and the master-detail links 206 (140). An example of the provider query 220 is shown in FIG. 5A, and an example of the master query plan 212 is shown in FIG. 5B. The master-detail provider 100 sends the provider query 220 as a request to the coordination planner 60 for execution (142).

During the execution phase, master queries are executed, the result dataset then is extended by the master-detail provider 100 to support the method GetDetailQueries, part of the master-detail link protocol.

Figures 6, 6A:
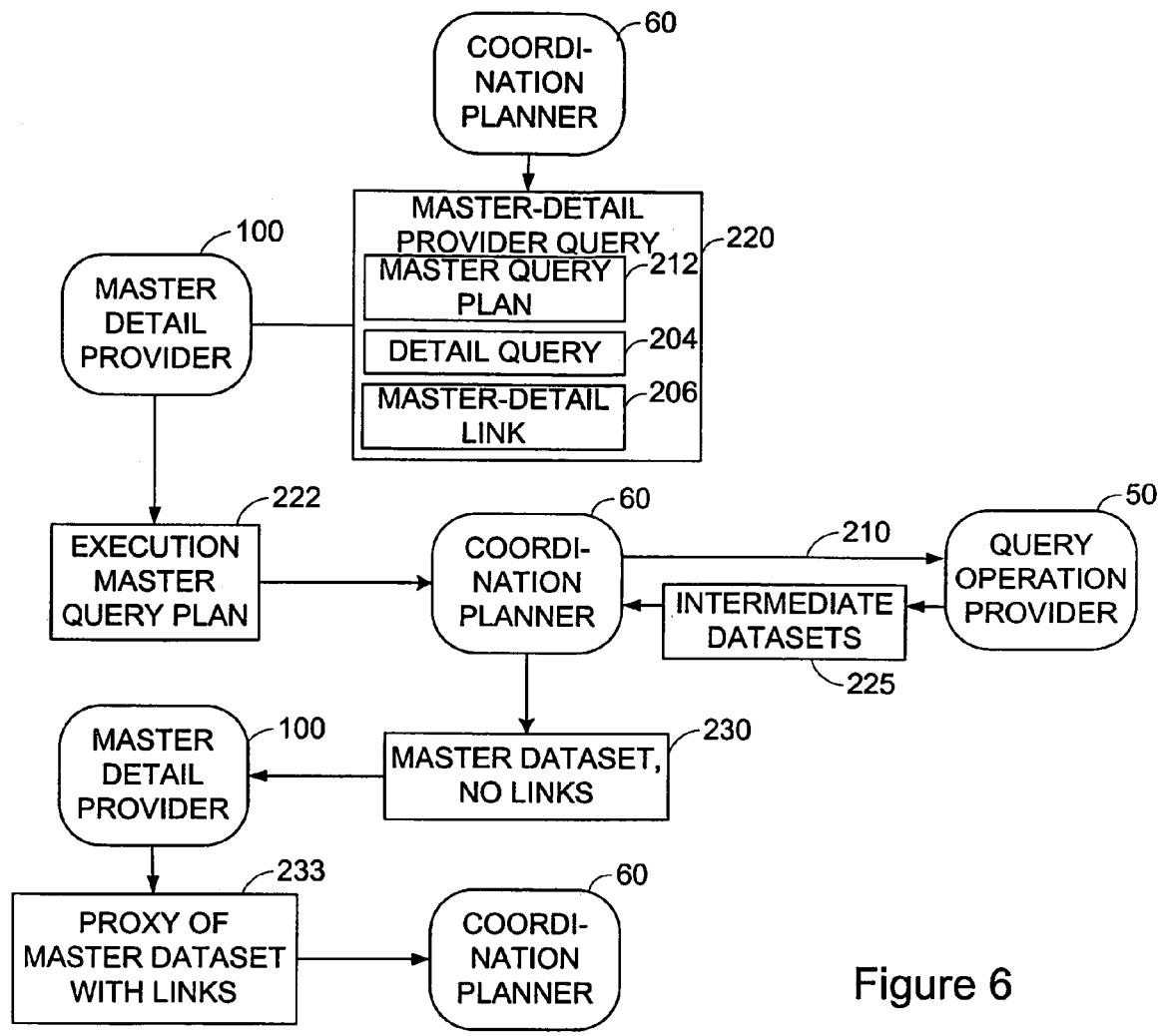
FIG. 6 is a flowchart showing interaction of the master-detail provider with the coordination planner during the execution phase of master queries.
FIG. 6A is a diagram showing an example of a master query plan.

FIG. 6 shows the execution of the master queries 202. The coordination planner 60 receives from the master-detail provider 100 requests 220, each including a master query plan 212 that contains a tree of one or more prepared provider queries 210. For each request 220, the coordination planner 60 dispatches to one or more appropriate query operation providers 50 each of the prepared provider queries 210 placed in the master query plan 212. The query operation providers 50 execute the prepared provider queries 210 and return master datasets 225. The coordination planner 60 returns a master dataset 230 for each of the executed master queries 222. The master-detail provider 100 then creates dataset objects 233 representing the result of the master-detail link operation. These master dataset objects 233 are acting as proxies to the master datasets 230 received from the coordination planner 60, i.e., they redirect all calls to the master dataset object 230 except the call of the method GetDetailQueries, which is the responsibility of the master-detail provider 100.

Figure 7:
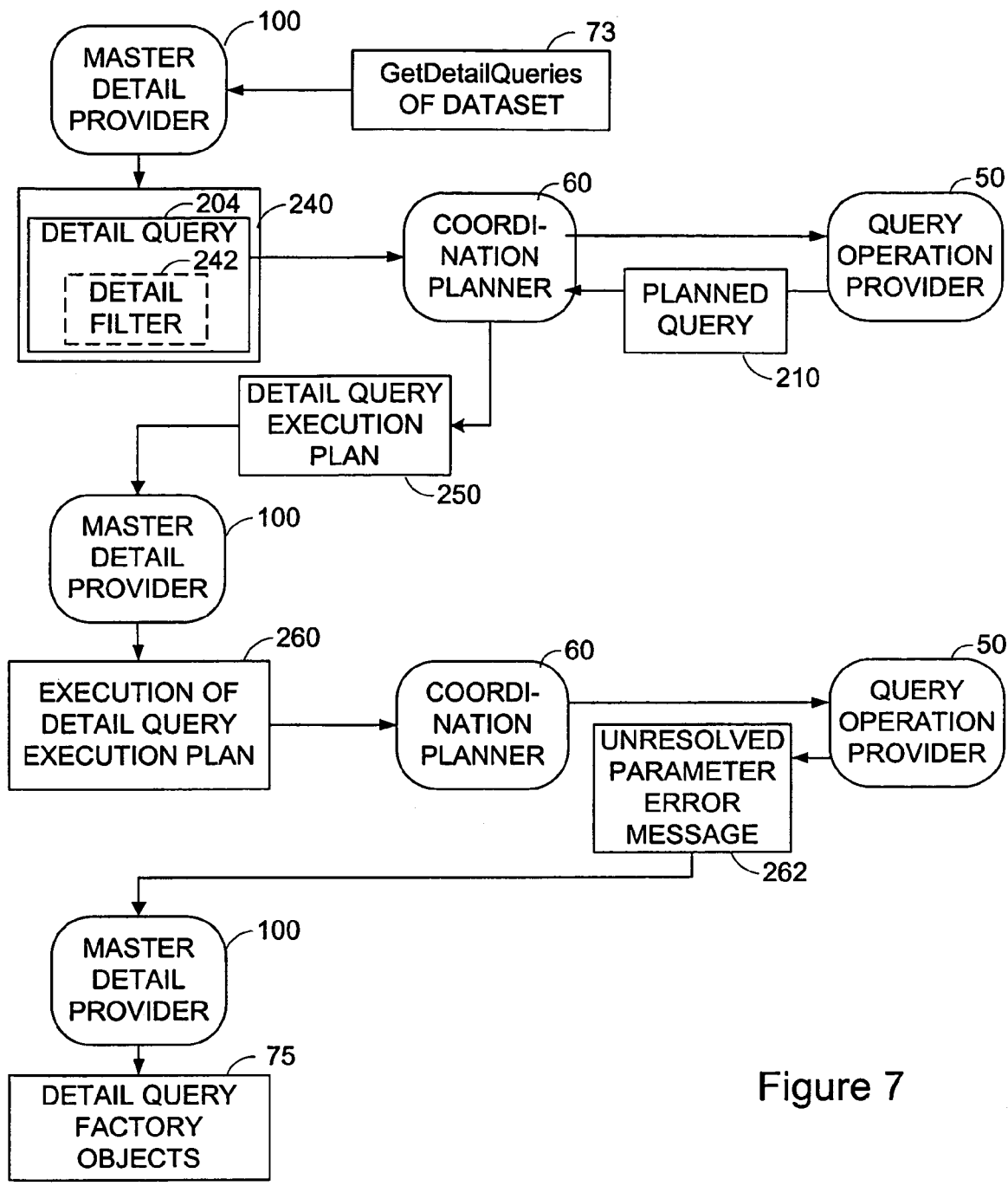
FIG. 7 is a flowchart showing interaction of the master-detail provider with the coordination planner to create detail query factory objects.

FIG. 7 shows processing of the GetDetailQueries method 73 of a master dataset proxy 233 that involves preparation of the detail queries 204, execution of them forcing an error message reporting description of parameters involved in the link definition and construction of detail query factory objects. Each request 220 contains one or more detail queries 204 which are unprepared queries. The master-detail provider 100 causes the unprepared queries to be transformed in the following manners, depending on the type of the master-detail links 206.

For an item-based master-detail link 206 at the preparation phase of the detail queries, the master-detail provider 100 generates a filter 242 and adds it to the detail query 204. To this end, the master-detail provider 100 composes conditions of the filter 242 that relates a parameter to be populated with the values of the master query item involved in the link definition and the detail query item involved in the link definition between master 202 and detail query 204. The master-detail provider 100 generates a filter 242 for each of the master-detail links 206, and incorporates the detail filter 242 into the specification of the respective detail query 204. The name of the parameter in each filter 242 is uniquely generated from the name of the related master query 202 and the name of the data item to which the master-detail link 206 references. The master-detail provider 100 preserves the parameter names and the referenced data items.

When the master-detail link 206 is based on parameters, a filter involving parameters 242 should already exist in the detail query 204. Alternatively, the parameters may be used as part of item expressions, and in that case, the filter is unnecessary.

During the preparation phase of detail queries 204, the master-detail provider 100 sends requests 240, each containing a detail query 204 having its associated filter 242, when it is needed (e.g. FIG. 7A), to the coordination planner 60. For each request 240, the coordination planner 60 sends the extended detail query 204 to an appropriate query operation provider 50 for preparation. The query operation providers 50 transform the detail query 204 into a partially planned query 210 that at the end of query processing sequence becomes completely planned. The coordination planner 60 then passes the end result of the detail query planning, the detail query execution plan 250, to the master detail provider 100. The master-detail provider updates the detail query node of its own provider query 220 by incorporating the returned execution plans of detail queries 250 FIG. 7B shows an example of the provider query participating in the detail query execution plan 250.

During the execution phase of the detail queries initiated by the master-detail provider 100 in order to capture properties of the parameters involved in the master-detail links, the master-detail provider 100 sends the detail query execution plan 250 as a detail query request to the coordination planner 60 for execution 260. The master-detail provider 100 dispatches each of the provider queries in the detail query execution plan 250, which is prepared from detail queries 260 that is extended when needed with the filters 242, to one or more appropriate query operation providers 50. Since each of the detail query requests 260 includes a filter 242 or an expression with a parameter, the execution of the detail query execution plan 250 triggers an error message 262 that is caught and analyzed by the master-detail provider 100. If any of the unresolved parameters is not related to the link definition and hence requires actual values to be passed in order to execute the query, the master-detail provider 100 issues an error message reporting one or more of these parameters as unresolved to the client data analyzing system 30 to react and prompt a user for the actual values for these parameters. If all unresolved parameters are involved in the link definition, the master-detail provider 100 creates a detail query factory object 75 and returns it back to the rendering component 33. A detail query factory object 75 keeps the parameter description information 77 and the relationship of these parameters to the master query items involved in the master-detail links. It uses this information when processing calls to its Execute method 76 and GetParameters method 74. FIG. 7C shows an example of the error message reporting the unresolved parameters 262.

Figure 8:
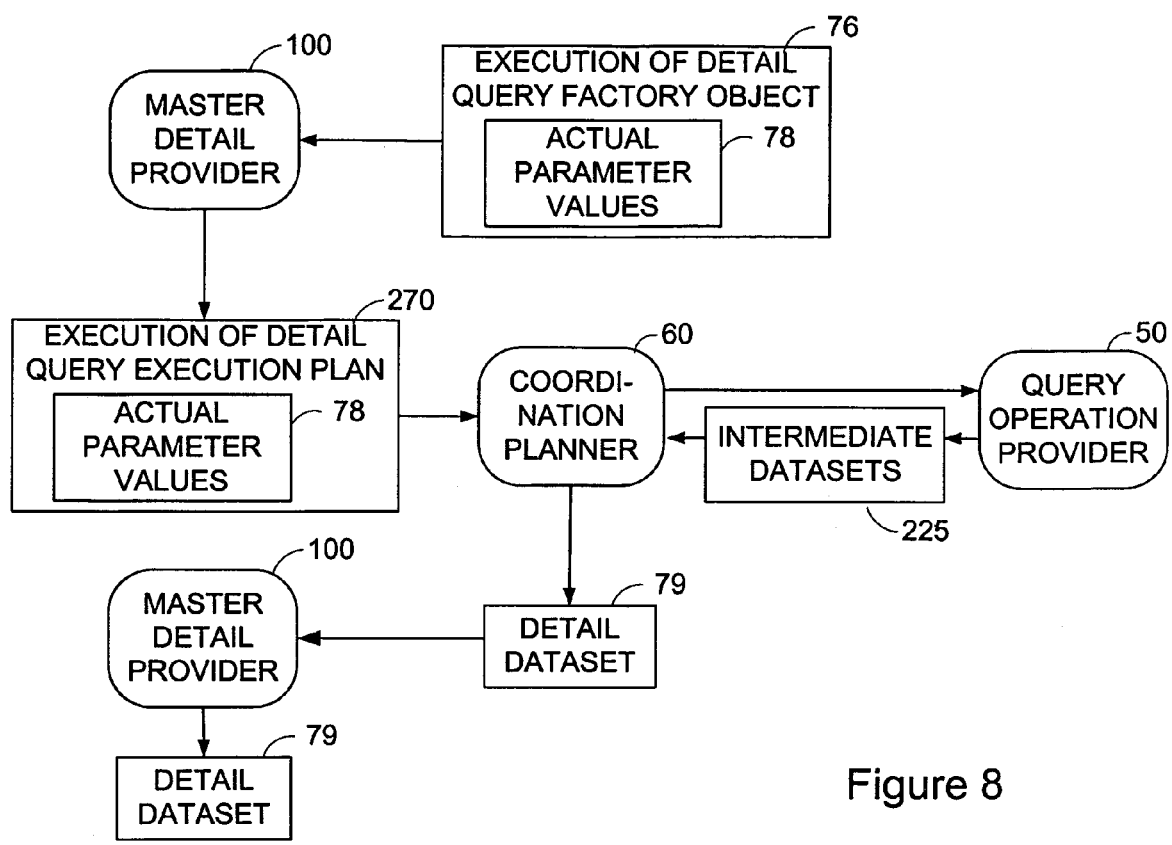
FIG. 8 is a flowchart showing interaction of the master-detail provider with the coordination planner during generation of a detail dataset.

Referring to FIG. 8, the phase of generation of detail query instances 79 is now described. It is triggered by the call to the execute method 76 of detail query factory object. The input for this method is the actual values for the parameters involved in the link definition. As the detail query factory object is generated by the master-detail provider 100, the provider receives this call directly from the rendering component 33. The master-detail provider 100 sends requests 240, each containing a detail query execution plan 270 based on the detail query rendition involving a generated filter 242, when needed, to the coordination planner 60. Part of the execution request sent to the coordination planner 60 is the actual values of the parameters 78 involved in the detail query 204. The coordination planner 60 in turn dispatches the provider queries comprising the detail query plan 250 included in the requests 270 to appropriate query operation providers 50 which return datasets representing the result of intermediate operations 225. The result of the root provider query in the detail query plan 250 is the result of the detail query instance. It is passed by the coordination planner 60 to the master-detail provider and then further to the rendering component 33 as the result of the detail query factory execution The execution 76 of each of the detail query factory object 75 is repeated. The number of the repetition is determined by the rendering component 33 invoking generation of detail query instances for the appropriate rows of the master dataset. The result of the execution 76 of detail query factory object is a detail dataset 79.

The rendering component 33 iterates over the detail dataset 79 to use its data for the rendered result of the master-detail operation reported back to the data analyzing system 30.

FIG. 8A shows an example of parameters 78. FIG. 8B shows an example of the request 270 sent by the master-detail provider 100 to the coordination planner 60 during processing the call to the Execute method 76 of the detail query factory object 75.

As described above, the master-detail provider 100 can be defined as the first component to be used in the query planning process invoked by the coordination planner 60. By doing so, the master-detail provider 100 may filter all requests received by the query framework system 10. It may intercept only the requests involving master-detail links. Alternatively in order to minimize the number of requests the master-detail provider has to analyze, the operation support table 16 can define an operation pattern associated with existence of the master-detail links in a user request and make this pattern mandatory for invocation of the master-detail provider 100.

For those master queries that are involved in master-detail links a provider query is generated associated with the master-detail provider 100. Generation of the provider query reflects the fact that there is a physical operation responsible for generation of detail query instances and this operation is implemented in the master-detail provider. This generation of the provider query also directs the coordination planner at the request execution phase to call master-detail provider to return a result dataset for intercepted master queries.

As explained above the master-detail provider 100 intercepts queries that contain master-detail links and resolves the master-detail link portion of them at the master-detail provider 100. The queries that are sent to the coordination planner 60 do not contain master-detail links, so that the query processing sequence of the recursive call to the coordination planner will not cause the master-detail provider to intercept the request in the recursive call. This way, the master-detail provider 100 avoids loops in the communication with the coordination planner 60 or other providers 50.

The master-detail provider 100 allows resolution of the master-detail functionality for all data sources for which the query processing system 10 has an access through corresponding plug-in components 50. It also allows for cross-data-source master-detail joins, given that both master and detail queries are treated as independent and can be issued against different data sources 30. The master-detail provider 100 may be replaced by alternative implementation of the master-detail functionality which allows for transparent upgrading/optimizing the master-detail functionality.

The master-detail provider of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal and its carrier are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A master-detail provider apparatus comprising:
    a query analyzer for analyzing one or more queries included in a user request for data stored in one or more data sources, and determining any set of the queries in which the queries are linked by one or more master-detail links;
    a master-detail link handler for relating the queries of each set that are linked by one or more master-detail links as a master query and one or more detail queries;
    a master query handler for causing preparation of the master queries to generate master query plans, and for generating provider queries by incorporating the master query plans with related detail queries and related master-detail links; and a detail query handler for causing preparation of the detail queries to generate detail query plans.

2. The master-detail provider apparatus as recited in claim 1, wherein
the detail query handler causes preparation of the detail queries to capture properties of parameters involved in the master-detail links and to generate detail query factory objects.

3. The master-detail provider apparatus as recited in claim 1, wherein the master handler generates a provider query for each master query participating in the master-detail links.

4. The master-detail provider apparatus as recited in claim 1, wherein the master handler extracts the master-detail links from the queries.

5. The master-detail provider apparatus as recited in claim 1, wherein the master handler causes the provider queries executed.

6. The master-detail provider apparatus as recited in claim 1, wherein the detail query handler has a filter generator for generating a detail filter for a detail query based on a respective master-detail link, and incorporating the detail filter into the detail query.

7. The master-detail provider apparatus as recited in claim 6, wherein the filter generator generates the detail filter having a reference to a parameter for receiving a parameter value.

8. The master-detail provider apparatus as recited in claim 7, wherein the detail query handler handles the detail queries using parameter values for execution of the detail queries.

9. A query framework system for processing user requests for data stored in one or more data sources, the query framework system comprising:
one or more query operation providers, each capable of preparing or executing relevant queries;
a coordination planner for coordinating communication between the query operation providers; and
a master-detail provider apparatus comprising:
a query analyzer for analyzing one or more queries included in a user request for data stored in one or more data sources, and determining any set of the queries in which the queries are linked by one or more master-detail links;
a master-detail link handler for relating the queries of each set that are linked by one or more master-detail links as a master query and one or more detail queries;
a master query handler for communicating with the coordination planner for preparation of the master queries to generate master query plans, and for generating provider queries by incorporating the master query plans with related detail queries and related master-detail links; and
a detail query handler for causing preparation of the detail queries to generate detail query plans.

10. The query framework system as recited in claim 9, wherein the master handler communicates with the coordination planner for execution of the provider queries.

11. The query framework system as recited in claim 9, wherein the detail query handler has a filter generator for generating a detail filter for a detail query based on a respective master-detail link, and incorporating the detail filter into the detail query.

12. The query framework system as recited in claim 11, wherein the filter generator generates the detail filter having a reference to a parameter for receiving a parameter value.

13. The query framework system as recited in claim 12, wherein the detail query handler communicates with the coordination planner for preparation and execution of the detail queries using parameter values.

14. A method of processing user requests for data stored in one or more data sources, the method comprising:
analyzing each set of the queries included in a user request for data stored in one or more data sources to locate any set of the queries in which the queries are linked by one or more master-detail links;
relating the queries of each set that are linked by one or more master-detail links as a master query and one or more detail queries;
causing preparation of the master queries to generate master query plans;
generating one or more provider queries by incorporating the master query plans with related detail queries and related master-detail links; and
sending the provider queries for execution.

15. The method as recited in claim 14 further comprising: extracting the master-detail links from the queries.

16. The method as recited in claim 14, wherein the generating also generates a provider query for each master query participating in the master-detail links.

17. The method as recited in claim 14 further comprising:
generating a detail filter for a detail query based on a respective master-detail link; and
incorporating the detail filter into the detail query.

18. The method as recited in claim 17, wherein the filter generating generates the detail filter having a reference to a parameter for receiving a parameter value.

19. The method as recited in claim 18 further comprising:
causing preparation of each detail query by having the detail filter transformed; and
generating a detail provider query by incorporating the detail query and the transformed detail filter.

20. The method as recited in claim 19 further comprising:
causing execution of the detail provider query by resolving the detail filter to generate parameterized detail queries; and
generating an execution request using the parameterized detail queries.

21. The method as recited in claim 15 further comprising:
receiving parameters values for resolving the parameterized detail queries; and
rendering the detail queries using the parameters values.

22. A memory containing computer executable instructions that can be read and executed by a computer for caring out a method of processing user requests for data stored in one or more data source, the method comprising the steps of:
analyzing each set of the queries included in a user request for data stored in one or more data sources to locate any set of the queries in which the queries are linked by one or more master-detail links;
relating the queries of each set that are linked by one or more master-detail links as a master query and one or more detail queries;
causing preparation of the master queries to generate master query plans;
generating one or more provider queries by incorporating the master query plans with related detail queries and related master-detail links; and
sending the provider queries for execution.

* * * * *